(12) United States Patent
Stellberger et al.

(10) Patent No.: US 6,580,250 B1
(45) Date of Patent: Jun. 17, 2003

(54) MONOLITHIC BATTERY PROTECTION CIRCUIT

(75) Inventors: Achim Stellberger, Kronau (DE); Michael Keller, Heidelberg (DE); Rolt Hülss, Hockenheim (DE); Frank Kronmüller, Neudenau (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 10/085,719

(22) Filed: Feb. 28, 2002

(51) Int. Cl.[7] .............................................. H01M 10/46
(52) U.S. Cl. ....................................... 320/134; 320/136
(58) Field of Search ................................. 320/134, 136, 320/132, 135, 137, 162, 164

(56) References Cited

U.S. PATENT DOCUMENTS

| | | | |
|---|---|---|---|
| 5,781,390 A | 7/1998 | Notaro et al. | 361/84 |
| 5,789,900 A | 8/1998 | Hasegawa et al. | 320/132 |
| 5,867,008 A | 2/1999 | Du et al. | 320/136 |
| 5,890,780 A | 4/1999 | Tomiyori | 307/86 |
| 5,896,025 A | 4/1999 | Yamaguchi et al. | 320/134 |
| 6,037,750 A | 3/2000 | Von Novak | 320/132 |
| 6,160,381 A | 12/2000 | Peterzell | 320/134 |
| 6,331,763 B1 * | 12/2001 | Thomas et al. | 320/136 |

FOREIGN PATENT DOCUMENTS

| | | | |
|---|---|---|---|
| EP | 0982826 A2 | 3/2000 | H02H/7/18 |
| WO | WO 00/51219 | 8/2000 | H02J/7/00 |

OTHER PUBLICATIONS

Fest J-P: "Sauvegarde: Gerer L'Intensite Dams Les Deux Sens," Electronique, CEP Communication, Paris, FR, No. 91, Apr., 1999, p. 14, XP000896733, ISSN: 1157–1152.

Stockstad et al., "A Micropower Safety IC for Rechargeable Lithium Batteries," Custom Intergrated Circuits Conf., 1996 Proceedings of the IEEE 1996, San Diego, CA, USA May 5–8, 1996, pp. 127–130.

* cited by examiner

*Primary Examiner*—Edward H. Tso
(74) *Attorney, Agent, or Firm*—George O. Saile; Stephen B. Ackerman; Douglas R. Schnabel

(57) ABSTRACT

In accordance with the objects of this invention, A battery protection circuit is achieved. The circuit comprises, first, a FET switch. Last, a control circuit determines the ON/OFF state of the FET switch. The FET switch and the control circuit comprise a single integrated circuit device. The control circuit may comprise over charge and over discharge detectors, a voltage reference, and a level shifter.

20 Claims, 3 Drawing Sheets

MONOLITHIC BATTERY PROTECTION CIRCUIT

BACKGROUND OF THE INVENTION (1) Field of the Invention

The invention relates to a circuit for protecting a battery, and more particularly, to a circuit for protecting a rechargeable battery wherein a control circuit and a FET switch are integrated onto a single integrated circuit device.

(2) Description of the Prior Art

Rechargeable batteries are used in a variety applications of portable electronic devices. In particular, rechargeable batteries are used for portable phones. Several types of batteries are used in the art, most notably those comprising lithium ion or $Li^+$. For optimum battery life and performance, the battery must be protected from excessive charging voltage during recharging and from over discharging while supplying the appliance.

Referring now to FIG. 1, an exemplary prior art battery protection circuit is shown. A rechargeable battery 10 is configured such that it can source energy to a load 34 or can be recharged by a charger source 38. Two MOSFET switches N1 18 and N2 26 are used to control the flow of current into (charging) and out of (discharging) the battery. The control circuit 14 controls the ON and OFF state of the switches 18 and 26. Typically, the switches comprise discrete devices. The control circuit 14 typically comprises a separate circuit from the switches. Each switch 18 and 26 contains a parasitic bulk-to-drain diode D1 22 and D2 30. By coupling each switch in an opposite manner, each of the parasitic diodes 22 and 30 conducts current in a different direction.

During normal charging or discharging of the battery 10, both of the switches are ON. However, if the control circuit 14 detects an over charging voltage from VBATT to GND, then the control circuit turns OFF the switch N1. Since the parasitic diode D1 22 also blocks current flow into the battery, the battery stops charging. In the case of an over discharging condition, the control circuit 14 would detect a too low battery voltage from VBATT to GND. The other switch N2 26 would be turned OFF. In this case, the parasitic diode D2 30 blocks current flow out of the battery 10.

The prior art circuit has at least two disadvantages. First, the use of discrete components 20 and 28 increases the manufacturing cost and space requirements for the protection circuit. Second, the discrete components exhibit a large ON resistance that represents a significant power loss for the circuit.

Several prior art inventions describe battery protection circuits. U.S. Pat. No. 6,037,750 to Von Novak describes a battery pack controller. Von Novak places the battery charging circuits (elements 206 and 208 of FIG. 2) inside the battery pack. Such an approach creates at least two significant problems. First, power consumption and heat build up from the charger may cause the connectivity to the external FET devices (202 and 204) to fail. Second, if the ground connection to the battery pack is lost, then control of the battery is lost. Battery charging may continue without control and may then result in a battery explosion. U.S. Pat. No. 5,781,390 to Notaro et al teaches an automotive battery protection circuit for protecting against reverse battery and over voltage. U.S. Pat. No. 5,896,025 to Yamaguchi et al describes a battery protection circuit. U.S. Pat. No. 5,789,900 to Hasegawa et al discloses a battery protection circuit showing two MOSFETs back-to-back. U.S. Pat. No. 6,160,381 to Peterzell discloses a battery pack protection circuit. Two MOSFET switches are used.

SUMMARY OF THE INVENTION

A principal object of the present invention is to provide an effective and very manufacturable circuit for protecting a battery.

A further object of the present invention is to provide a battery protection circuit with reduced manufacturing cost.

Another further object of the present invention is to provide a battery protection circuit with reduced space requirements.

Another further object of the present invention is to provide a battery protection circuit with reduced ON resistance in the safety circuit.

A still further object of the present invention is to provide a circuit that protects the battery even if the ground connection to the battery pack is lost.

In accordance with the objects of this invention, a battery protection circuit is achieved. The circuit comprises, first, a FET switch. Last, a control circuit determines the ON/OFF state of the FET switch. The FET switch and the control circuit comprise a single integrated circuit device. The control circuit may comprise over charge and over discharge detectors, a voltage reference, and a level shifter.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose a novel circuit for protecting a battery. The circuit uses a novel, battery protection circuit. The circuit comprises a control circuit and a FET switch on a single integrated circuit. It should be clear to those experienced in the art that the present invention can be applied and extended without deviating from the scope of the present invention.

Figure 1:
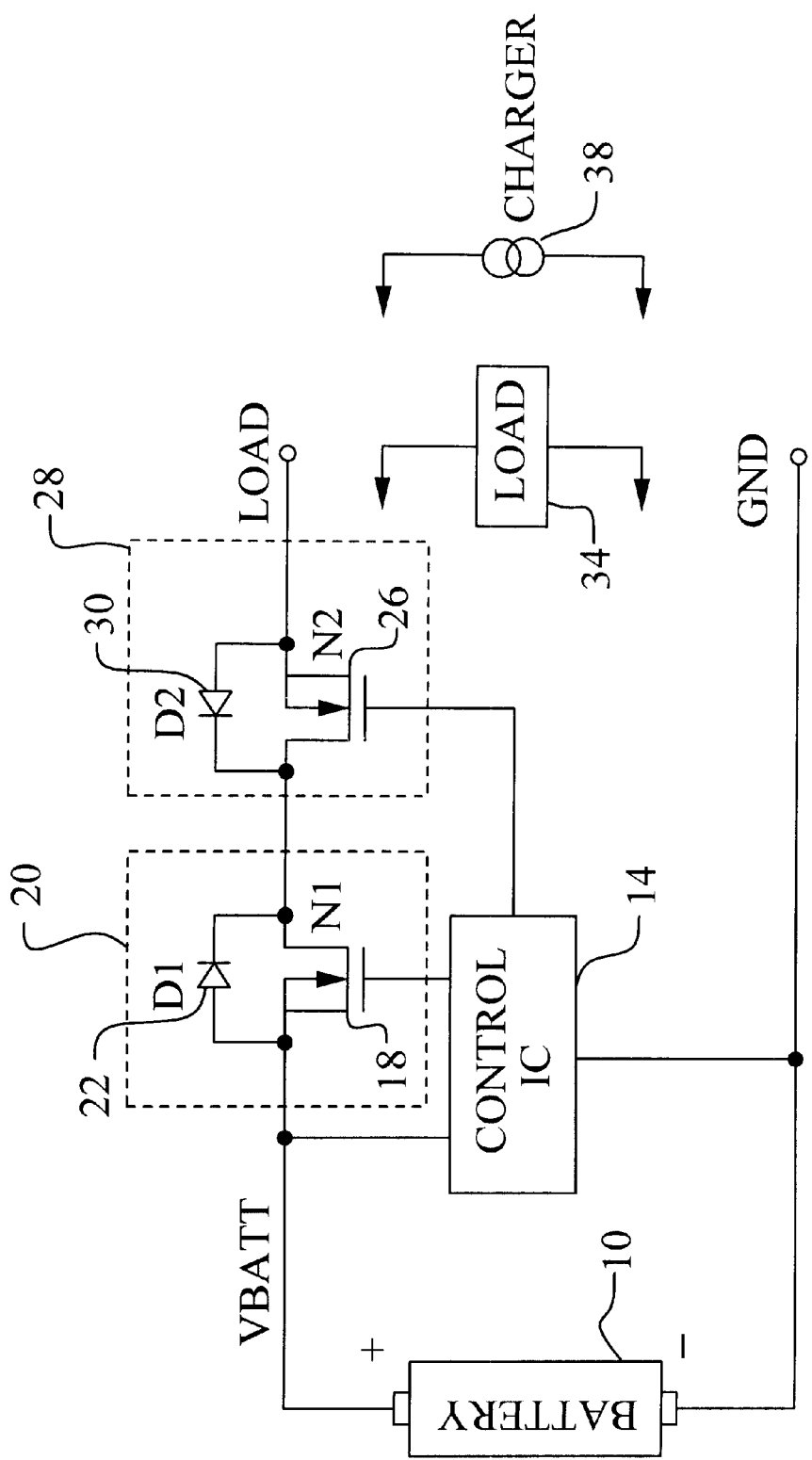
FIG. 1 illustrates a prior art battery protection circuit.
Figure 2:
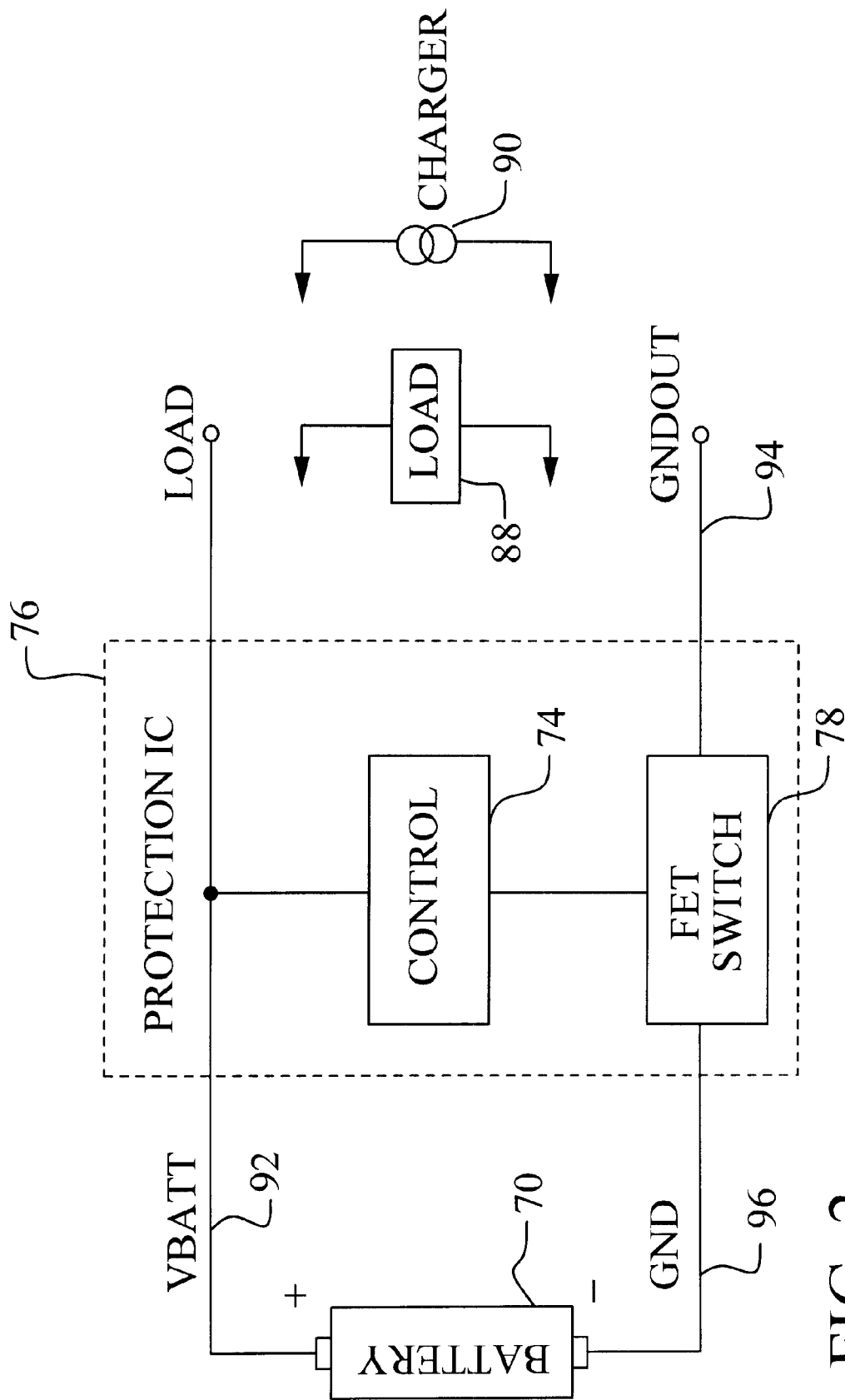
FIG. 2 illustrates a first preferred embodiment of the battery protection circuit of the present invention.

Referring now to FIG. 2, the first preferred embodiment of the battery protection circuit of the present invention is illustrated. Several important features of the present invention are shown. The circuit 76 protects a battery 70 and, more preferably, a rechargeable battery 70. The protection circuit 76 is preferably formed in the battery pack with the rechargeable battery 70. However, the charging circuit 90 is formed outside the battery pack. The protection circuit 76 comprises, first, a FET switch 78. Last, a control circuit 74 determines the ON/OFF state of the FET switch 78. Most importantly, the FET switch 78 and the control circuit 74 comprise a single integrated circuit device 76.

The FET switch 78 may comprise a single NMOS device, a single PMOS device, two or more NMOS devices, or two or more PMOS devices. In the embodiment shown, the FET switch 78 is coupled in the ground path between the negative, or GND, terminal 96 of the battery 70 and the ground output (GNDOUT) 94. In this configuration, the FET switch 78 controls current flow through the ground path to protect the battery 70 from error conditions. For a ground path protection scheme, as shown, the FET switch 78 preferably comprises one or more NMOS devices. Alternatively, the FET switch 78 may be placed in the positive, or load path, wherein the FET switch 78 would be coupled between the positive battery terminal, VBATT 92, and the LOAD pin. In the positive path configuration, the FET switch 78 may be either one or more PMOS devices or one or more NMOS devices. If NMOS devices are used in the positive protection scheme, then a charge pump will be needed for driving the transistor gates.

Figure 3:
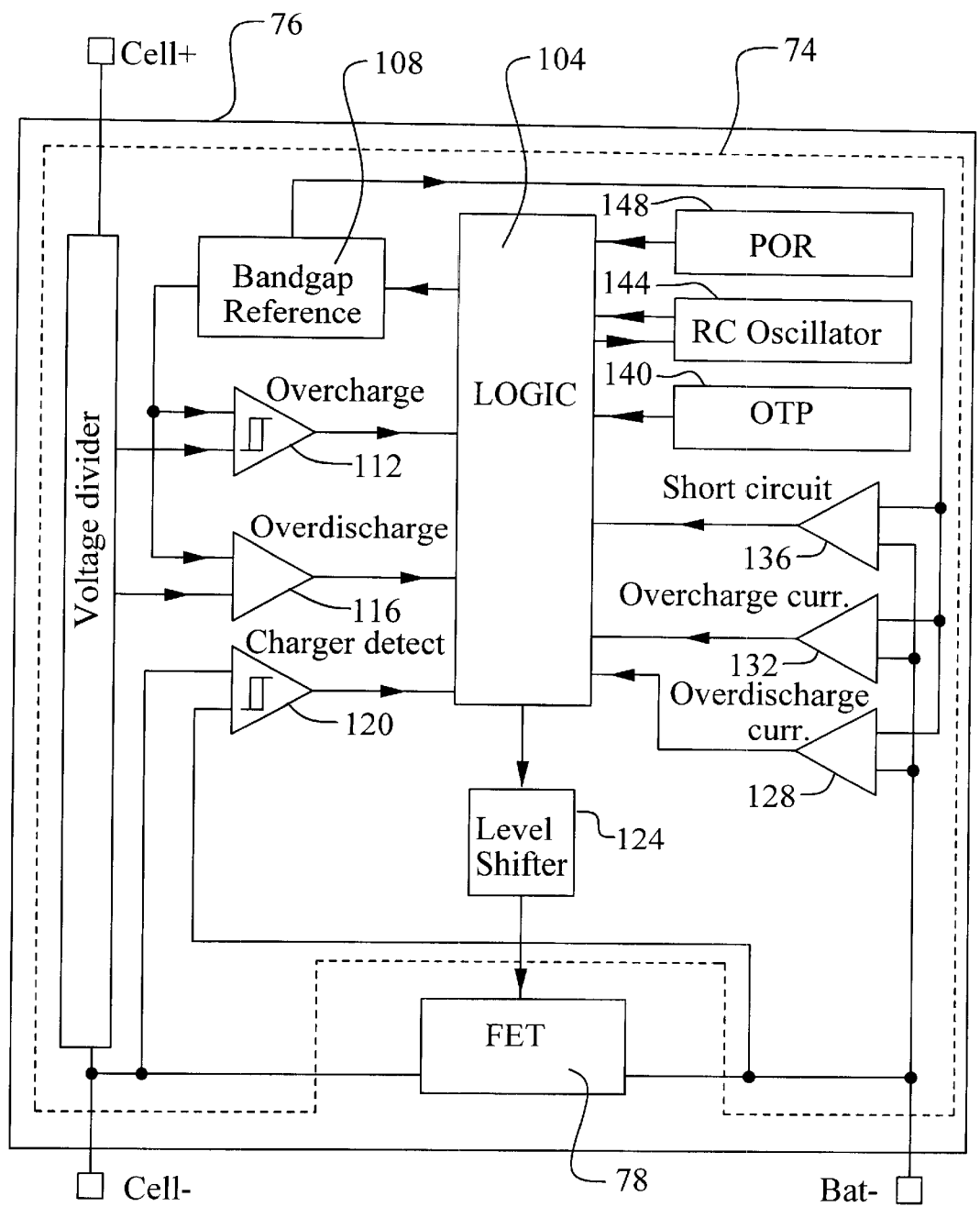
FIG. 3 illustrates a second preferred embodiment of the battery protection circuit of the present invention.

The control circuit 74 controls the ON/OFF state of the FET switch 78. To control the FET switch 78 over all conditions, the control circuit 74 preferably comprises circuits to sense error conditions, to sense the regulated voltages, and to drive the FET switch gates. Referring now to FIG. 3, a second preferred embodiment of the protection circuit is shown. The protection integrated circuit 76 is again divided into a control block 74 and a FET switch block 78. In this example, the control circuit 74 is further divided into a logic block 104, a bandgap reference block 108, over charge and over discharge voltage sensing blocks 112 and 116, a charger detection block 120, a level shifter 124, a power on reset (POR) 148, a RC oscillator 144, a one-time program (OTP) block 140, and short circuit current 136, over charge current 132, and over discharge current blocks 128. The control circuit 74 may comprise any, combinations of any, and combinations of all of the blocks shown.

The POR block 148 is used for initializing the control circuit 74 after a power down. The RC oscillator 144 generates a timing clock for use in the logic block 104 for determining error state status and for controlling the FET switch 78. The OTP 140 is used for configuring the device 76. The bandgap reference 108 is used to generate a temperature independent, standalone voltage reference. The over charge voltage detector 112 and over discharge voltage detector 116 preferably use the voltage reference. The charger detect circuit 120 detects the presence of a charging device across the cell terminals. Current error detection circuits, such as the short circuit current 136, over charge current 132, and over discharge current blocks 128, may also use the bandgap 108 reference. The logic circuit 104 uses all of the sensing circuits to make decisions governing the control of the FET switch 78. A level shifter 124 may be used to increase the voltage swing of the output of the logic circuit 104. The shifter 124 is especially useful if a low operating voltage is used in the logic block 104 while a larger operating voltage is needed to switch the FET switch 78.

It is important to note that the present invention has the advantages of reduced cost and reduced space requirements when compared to the prior art. By combining the control circuit and the FET switch onto a single IC, the cost and area of the function can be reduced substantially. In addition, the use of integrated FET switch devices results in a lower ON resistance for the FET switches. Third, the preferred embodiment of the present invention is formed on a single IC and is preferably further integrated into the battery pack. Finally, by separating the battery and protection circuit from the charging circuit, the problems of heat-induced reliability failure and of loss of charging control, during a loss of ground to the battery pack, are solved.

The critical advantages of the present invention over the prior art may now be summarized. First, an effective and very manufacturable circuit for protecting a battery is achieved. The battery protection circuit exhibits reduced manufacturing cost and space requirements. The monolithic battery protection circuit exhibits reduced ON resistance in the safety circuit. Finally, the battery is protected even if the ground connection to the battery pack is lost.

As shown in the preferred embodiments, the novel circuit provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A battery protection circuit comprising:
   a FET switch; and
   a control circuit wherein said control circuit determines the ON/OFF state of said FET switch and wherein said FET switch and said control circuit comprise a single integrated circuit device.

2. The circuit according to claim 1 wherein said FET switch comprises a NMOS FET.

3. The circuit according to claim 1 wherein said FET switch comprises a PMOS FET.

4. The circuit according to claim 1 wherein said FET switch comprises at least two NMOS FET devices.

5. The circuit according to claim 1 wherein said FET switch comprises at least two PMOS FET devices.

6. The circuit according to claim 1 wherein said control circuit further comprises an over charge voltage detector and an over discharge voltage detector.

7. The circuit according to claim 1 wherein said control circuit further comprises a level shifting circuit to drive said FET switch.

8. The circuit according to claim 1 wherein said control circuit further comprises a short circuit detector, an over charge current detector and an over discharge current detector.

9. The circuit according to claim 1 wherein said control circuit further comprises a bandgap voltage reference.

10. A battery protection circuit comprising:
    a FET switch; and
    a control circuit wherein said control circuit determines the ON/OFF state of said FET switch, wherein said FET switch and said control circuit comprise a single integrated circuit device, and wherein said protection circuit and a battery are formed in a common battery pack.

11. The circuit according to claim 10 wherein said FET switch comprises at least one NMOS FET device.

12. The circuit according to claim 10 wherein said FET switch comprises at least one PMOS FET device.

13. The circuit according to claim 10 wherein said control circuit further comprises a level shifting circuit to drive said FET switch.

14. The circuit according to claim 10 wherein said control circuit further comprises a bandgap voltage reference.

15. The circuit according to claim 10 wherein said control circuit further comprises an over charge voltage detector and an over discharge voltage detector.

16. The circuit according to claim 10 wherein said control circuit further comprises a short circuit detector, an over charge current detector and an over discharge current detector.

17. A battery protection circuit comprising:
    a FET switch; and
    a control circuit wherein said control circuit determines the ON/OFF state of said FET switch, wherein said FET switch and said control circuit comprise a single integrated circuit device, wherein said control circuit further comprises an over charge voltage detector and an over discharge voltage detector, and wherein said control circuit further comprises a short circuit detector, an over charge current detector and an over discharge current detector.

18. The circuit according to claim 17 wherein said FET switch comprises at least one NMOS FET.

19. The circuit according to claim 17 wherein said FET switch comprises at least one PMOS FET.

20. The circuit according to claim 17 wherein said control circuit further comprises a bandgap voltage reference.

* * * * *